Feb. 8, 1955 N. F. ARONE 2,701,776
ELECTRICAL INSULATING MATERIAL AND METHOD OF MAKING
Filed July 11, 1952
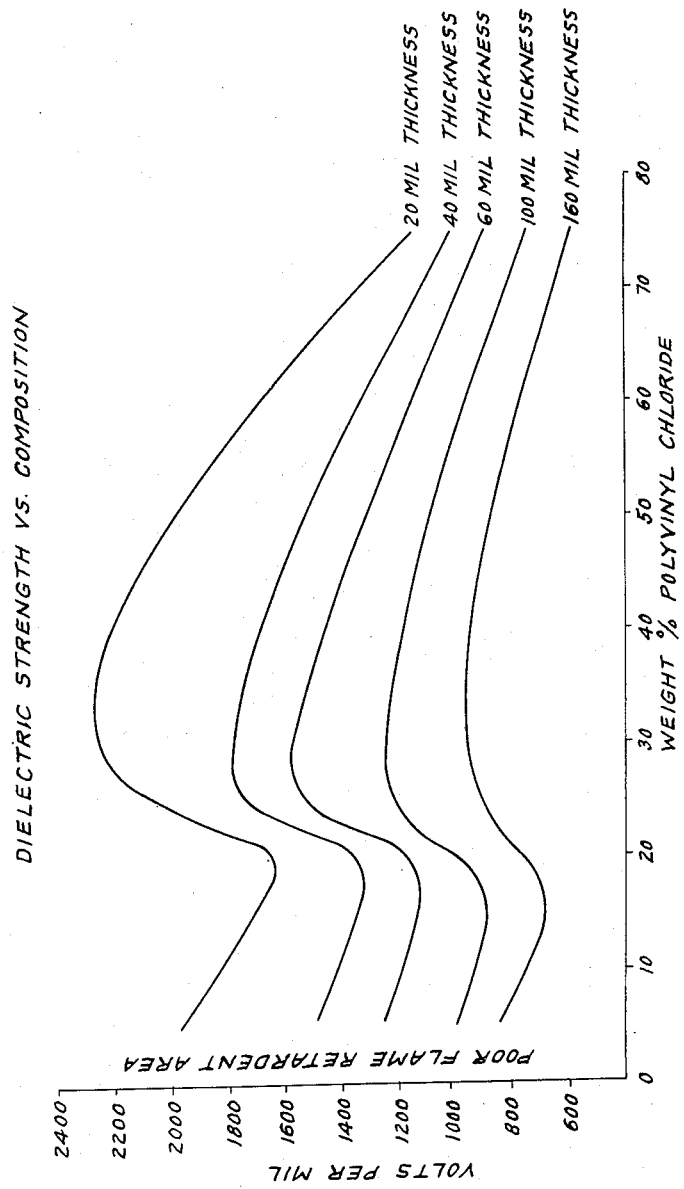
Inventor:
Nicholas F. Arone,
by Paul A. Frank
His Attorney.

United States Patent Office 2,701,776
Patented Feb. 8, 1955

2,701,776

ELECTRICAL INSULATING MATERIAL AND METHOD OF MAKING

Nicholas F. Arone, Upper Darby, Pa., assignor to General Electric Company, a corporation of New York Application July 11, 1952, Serial No. 298,259

8 Claims. (Cl. 117—76)

This invention relates to electrical insulating material and the production thereof. More particularly, the present invention is directed to such insulating material which has good electrical and mechanical properties, is unaffected by moisture, and is flame retardant. This application is a continuation-in-part of my application Serial No. 187,680, filed September 29, 1950, and now abandoned.

In general, it is desirable that electrical insulating material have a low power factor, a high dielectric constant, and a high dielectric strength in order that it may withstand high electrical stresses and have low electrical losses. It is further desirable that its electrical characteristics be unaffected by moisture. In certain applications, notably in capacitance bushings, bus bars and the like, it is desirable that such material be flame-resistant or retardant and noncombustible.

While organic resins are usually very suitable for the manufacture of laminated or other insulating material which has desirable electrical characteristics and is mechanically strong, as a general rule, such insulation is subject to deterioration and burning at high temperatures.

An object of the present invention is to provide low cost, readily fabricated and mechanically strong electrical insulating material.

It is a further object of this invention to provide such insulating material which is suitable for use under high voltage conditions.

Another object is to provide such material which is flame-resistant or retardant.

Other objects will become apparent and the invention better understood from a consideration of the following description.

My application Serial No. 187,680 disclosed that strong electrical insulating material having high electrical strength, low losses, and which is flame-resistant may be provided by first treating a base material with a phenol formaldehyde resin, curing, treating with a mixture of polyvinylchloride and aniline formaldehyde resin, and again curing. I have now discovered that superior properties may be imparted to my insulating material if the aniline formaldehyde resin includes a large proportion of phenol formaldehyde resin.

More particularly, it has been found that a base fibrous material such as paper, cloth, cellulose fibers and the like should first be impregnated with a solution of phenol formaldehyde resin in a 50–50 mixture by weight of water and alcohol and cured with heat. The product obtained above is then treated with a solution of polyvinyl chloride resin, phenol formaldehyde resin and aniline formaldehyde resin in a suitable solvent such as acetone, formed into laminae or a body of the desired size and cured under heat and pressure.

The drawing is a graph showing the dielectric strength plotted against the weight percent of polyvinyl chloride in the resin mixture for resin thicknesses varying from 20 mils to 160 mils. This graph shows that the dielectric strength is at a maximum when polyvinyl chloride is present in the mixture to the extent of about 25% to 35% by weight.

The base material or body which is treated according to the present invention preferably consists of paper or other cellulosic fibrous material or fibers, including exploded cellulose, because of the low cost of such material. However, other fibrous materials such as glass fibers, asbestos and the like may also be used.

The phenol formaldehyde resin solution used can vary widely in strength depending upon the exact characteristics desired in the final product. Preferably, however, the solution contains from 10% to 20% by weight of phenol formaldehyde in a 50% by weight water and 50% by weight alcohol solution. Any of the lower alcohols containing up to four carbon atoms can be used in the preparation of the resin solution, typical examples being methyl alcohol, ethyl alcohol, propyl alcohol, isopropyl alcohol, and butyl alcohol.

The proportions of polyvinyl chloride resin to phenol formaldehyde and aniline formaldehyde resins can vary from 10% to 75% by weight of polyvinyl chloride resin, the rest being a mixture of phenol formaldehyde and aniline formaldehyde. It has been found that the use of less than 10% by weight of polyvinyl chloride resin results in flaming of the material when exposed to a high intensity arc. The preferable range of polyvinyl chloride content in the resin mixture is 25% to 35% by weight while the preferred specific composition is 30% by weight polyvinyl chloride resin and 70% by weight phenol formaldehyde and aniline formaldehyde resins.

The phenol and aniline formaldehyde resins may be present in varying proportions within a range of twenty-five to ninety percent aniline formaldehyde. In general, I prefer to have more phenol formaldehyde than aniline formaldehyde present, a preferred ratio being about two parts by weight of phenol formaldehyde for each part by weight of aniline formaldehyde. Optionally, I may include about 1% ammonia and less than one percent of a wax such as candelilla wax in this mixture.

The treating solution of polyvinyl chloride, phenol formaldehyde and aniline formaldehyde resin can be made in any of a number of ways. Usually, for convenience, the resins are powdered and blended together in the desired proportions. The resin mixture is then thoroughly mixed into an organic solvent such as acetone or alcohol. The amount of solvent used depends upon the base material to be treated; for example, in treating paper four mils thick, a total of about 40% by weight resin in acetone is used. A general purpose polyvinyl chloride-phenol-aniline formaldehyde solution for treating unagglomerated fibers likewise preferably contains about 40% by weight resin, while for heavier paper such as about ten mils thick or more, about a 30% by weight solution is used. The exact proportions of resin and acetone to be used for obtaining a liquid of proper viscosity for treating other materials will easily be determined by those skilled in the art.

In carrying out the present invention the base material is first impregnated with the phenol formaldehyde resin solution and cured under heat. The phenol formaldehyde may also be added during the beater stage of the paper or insulating sheet making process. The degree of heat and the time depends upon the particular material treated; in the case of paper, about four mils thick a bake at 250° for fifteen minutes has been found adequate, though it may be treated for up to ninety minutes. Alternately, the product is heated at lower temperatures for a longer time, for example at 215° F. for about 180 minutes.

The product after being cured is passed through the polyvinyl chloride-phenol-aniline formaldehyde acetone mixture so that it becomes thoroughly impregnated with the resin. The material is then preferably dried to remove excess solvent material. Air drying may be used though oven drying is preferred; for example, heating at 250° F. for up to fifteen minutes is satisfactory. The dried product is then cut to size and formed into laminae in sheet form or placed in a mold of desired shape if in loose fibrous form and cured under heat and pressure. In general, pressures of from about 800 lbs. per sq. in. to 2000 lbs. per sq. in. at temperatures of about 300° F. are indicated. The time of cure varies depending upon the temperature and thickness used and usually ranges from about 90 to 120 minutes for flat laminates.

The resin content of the final product, of course, depends upon the concentration of the resin impregnating solutions used. When a 10% by weight phenol formaldehyde solution as described above is used for the first impregnation and a 10% polyvinyl chloride–60% phenol formaldehyde–30% aniline formaldehyde solution for the second impregnation the fibrous material content of the final product is about 60% by weight and the resin content about 40%. Of the resin content about 7% is aniline formaldehyde, about 3% is polyvinyl chloride and 30% is phenol formaldehyde. Using a 20% by weight phenol formaldehyde impregnant, and a second impregnant consisting of 75% by weight polyvinyl chloride and 25% aniline formaldehyde the final content of the insulation is about 40% by weight fibrous material, about 3% aniline formaldehyde, about 27% polyvinyl chloride and 32% phenol formaldehyde.

In general the content of insulation which has been found suitable for the purpose of the present invention varies from, by weight, 40% to 60% fibrous material, 2% to 11% aniline formaldehyde resin, 3% to 27% polyvinyl chloride and 19% to 46% phenol formaldehyde. The preferred range of final product contains, by weight, from 40% to 55% fibrous material, 6% to 11% aniline formaldehyde resin, 6% to 14% polyvinyl chloride and 28% to 41% phenol formaldehyde resin. The preferred specific insulation contains, by weight from 48% to 50% fibrous material, 7% to 8% aniline formaldehyde, 10% to 11% polyvinyl chloride and 33% phenol formaldehyde.

The material of the present invention may be shaped into any form desired for electrical purpose, such as bushings, bus bar insulation and the like. The power factor of material using a paper base is less than 5% at room temperature and at 60 cycles. The dielectric strength perpendicular to the laminae at room temperature is about 680 volts per mil while at 100° C. it is about 340 volts per mil. After 24 hours in an atmosphere having a 95% relative humidity, the dielectric strength at room temperature was 600 volts per mil. When exposed to an electric arc at 350 amp. and 1000 volts for 10 seconds, all flaming of the material had ceased in under one minute. When the same material was tested according to ASTM Designation, D635–44, "Standard Method of Test for Flammability of Plastics over 0.050 Inch in Thickness," they showed no evidence of burning whatsoever. Only under the much more rigorous test described above was any combustion evident to a small degree.

Insulation material made from exploded cellulose fibers treated as described above has a power factor at 60 cycles and at room temperature of 0.84% as compared to a power factor of about 12% for the untreated material pressed into a board. After 65 hours at 100% relative humidity the power factor of the present material was about 1.3% while that of the untreated but pressed material was about 25%.

What I claim as new and desire to secure by Letters Patent of the United States is:

1. Flame retardant moisture resistant electrical insulation comprising a fibrous base material impregnated with, by weight, based on the total weight of said electrical insulation, from 19 to 46 percent phenol-formaldehyde resin, 3 to 27 percent polyvinyl chloride resin and 2 to 11 percent aniline-formaldehyde resin, a portion of said phenol-formaldehyde resin having been incorporated into said fibrous base material and cured prior to the addition of the remainder of said resins.

2. Flame retardant moisture resistant electrical insulation comprising a fibrous base material impregnated with, by weight, based on the total weight of said electrical insulation, from 28 to 41 percent phenol-formaldehyde resin, 6 to 14 percent polyvinyl chloride resin, and 6 to 11 percent aniline-formaldehyde resin, a portion of said phenol-formaldehyde resin having been added to said fibrous base material and cured prior to the addition of the remainder of said resins.

3. Flame retardant moisture resistant electrical insulation material comprising a fibrous base material impregnated with, by weight, based on the total weight of said electrical insulation, 33 percent phenol-formaldehyde resin, 10 to 11 percent polyvinyl chloride resin, and 7 to 8 percent aniline-formaldehyde resin, a portion of said phenol-formaldehyde resin having been incorporated into said fibrous base material and cured prior to the addition of the remainder of said resins.

4. Flame retardant moisture resistant electrical insulation comprising, by weight, 40 to 60 percent fibrous material, 19 to 46 percent phenol-formaldehyde resin, 3 to 27 percent polyvinyl chloride resin, and 2 to 11 percent aniline-formaldehyde resin, a portion of said phenol-formaldehyde resin having been incorporated into said fibrous material and cured prior to the addition of the remainder of said resins.

5. Flame retardant moisture resistant electrical insulation material comprising, by weight, 48 to 50 percent fibrous material, 33 percent phenol-formaldehyde resin, 10 to 11 percent polyvinyl chloride resin, and 7 to 8 percent aniline-formaldehyde resin, a portion of said phenol-formaldehyde resin having been incorporated into said fibrous material and cured prior to the addition of the remainder of said resins.

6. Flame retardant moisture resistant electrical insulation comprising, by weight, 40 to 55 percent fibrous material, 28 to 41 percent phenol-formaldehyde resin, 6 to 14 percent polyvinyl chloride resin, and 6 to 11 percent aniline-formaldehyde resin, a portion of said phenol-formaldehyde resin having been incorporated into said fibrous base material and cured prior to the addition of the remainder of said resins.

7. Flame retardant moisture resistant electrical insulation comprising, by weight, 40 to 60 percent fibrous material, 19 to 46 percent phenol-formaldehyde resin, 3 to 27 percent polyvinyl chloride resin and 2 to 11 percent aniline-formaldehyde resin, said insulation having been prepared by (a) impregnating a fibrous material with a 10 to 20 weight percent solution of phenol-formaldehyde resin, (b) curing the product of (a) at elevated temperatures, (c) impregnating the product of (b) with a solution of polyvinyl chloride resin, aniline-formaldehyde resin and phenol-formaldehyde resin containing from 10 to 75 weight percent of polyvinyl chloride resin and from 25 to 90 weight percent of aniline-formaldehyde and phenol-formaldehyde resins based on the total resin content of the solution, said aniline-formaldehyde resin being present in the ratio of from 0.25 to 9 parts by weight per part by weight of phenol-formaldehyde resin, and (d) curing the product of (c) at elevated temperatures.

8. The process of preparing a flame retardant moisture resistant electrical insulation material consisting essentially of, by weight, 40 to 60 percent fibrous material, 3 to 27 percent polyvinyl chloride resin, 2 to 11 percent aniline-formaldehyde resin, and 19 to 40 percent phenol-formaldehyde resin, which process comprises (a) impregnating the aforesaid fibrous material with a 10 to 20 weight percent solution of phenol-formaldehyde resin, (b) curing the product of (a) at elevated temperatures, (c) impregnating the product of (b) with a solution of polyvinyl chloride resin, aniline-formaldehyde resin and phenol-formaldehyde resin containing from 10 to 75 weight percent of polyvinyl chloride resin and from 25 to 90 weight percent of aniline-formaldehyde and phenol-formaldehyde resins based on the total resin content of the solution, said aniline-formaldehyde resin being present in the ratio of from 0.25 to 9 parts by weight per part by weight of phenol-formaldehyde resin, and (d) curing the product of (c) at elevated temperatures.

References Cited in the file of this patent

UNITED STATES PATENTS

| | | |
|---|---|---|
| 2,117,591 | Alexander | May 17, 1938 |
| 2,401,138 | Coes | May 28, 1946 |
| 2,534,923 | Nagel et al. | Dec. 19, 1950 |
| 2,554,262 | Nagel | May 22, 1951 |

FOREIGN PATENTS

| | | |
|---|---|---|
| 607,913 | Great Britain | Sept. 7, 1948 |